United States Patent [19]
Williams et al.

[11] 3,753,725
[45] Aug. 21, 1973

[54] METHOD FOR ENZYMATIC CONVERSION OF LACTOSE TO GLUCOSE AND GALACTOSE IN LACTOSE CONTAINING FLUIDS

[76] Inventors: Roger J. Williams; Marvin Kendall Young, both of Austin, Tex.

[22] Filed: Mar. 11, 1971

[21] Appl. No.: 123,166

[52] U.S. Cl............................ 99/54, 99/59, 195/11, 195/31 R, 195/104, 195/105
[51] Int. Cl................................................ A23c 9/14
[58] Field of Search .................... 99/54, 55, 60, 31, 99/57, 116, 59; 195/11, 31, 104, 105

[56] References Cited
UNITED STATES PATENTS

| | | | |
|---|---|---|---|
| 2,749,242 | 6/1956 | Stimpson | 99/55 |
| 2,826,502 | 3/1958 | Sfortunato | 99/54 |
| 2,826,503 | 3/1958 | Roberts | 99/54 |
| 2,437,080 | 3/1948 | Daniel | 99/57 |
| 3,425,839 | 2/1969 | Pinnegar | 99/31 |

Primary Examiner—S. Leon Bashore
Assistant Examiner—Frederick Frei
Attorney—Stowell & Stowell

[57] ABSTRACT

A process-fluid containing lactose, such as milk, flows through a first chamber that is juxtaposed to a second chamber and separated therefrom by a semi-permeable membrane. An enzyme-fluid, which is a fluid similar to the process-fluid but containing lactose, flows through the second chamber to convert the lactose in the fluids in the chambers to glucose and galactose at a rate dependent upon the temperature and concentration of the enzyme. The membrane allows lactose, glucose and galactose to pass between the chambers but prevents passage of the lactose from the second chamber due to its large molecular weight. The levels of glucose and galactose are controlled by constantly removing such substances with a fluid, similar to the process-fluid, that flows at a rapid rate in a third chamber surrounding the other chambers and separated therefrom by a semi-permeable membrane, 9 Claims, 3 Drawing Figures

METHOD FOR ENZYMATIC CONVERSION OF LACTOSE TO GLUCOSE AND GALACTOSE IN LACTOSE CONTAINING FLUIDS

BACKGROUND OF THE INVENTION

1. Field of The Invention

The present invention generally appertains to the enzymatic conversion of lactose to glucose and galactose in lactose containing fluids, such as milk products, and more particularly relates to a new and novel apparatus and attendant process for treating milk with lactase in an active but indirect and continuous flow manner to convert the lactose therein to glucose and galactose and to obtain lactose-free or low-lactose milk.

2. State of The Prior Art

An enzymatic lactose hydrolysis process is generally disclosed in U.S. Pat. No. 2,681,858, issued June 22, 1954 to Stimpson. An improvement over the Stimpson process is described in the Sfortunato U.S. Pat. No. 2,826,502, granted Mar. 11, 1958. The Sfortunato process is distinguished from the Stimpson process in two main particulars, namely, in using a higher proportion of lactase to lactose at all times and in the incremental addition of lactose during hydroysis.

In the Sfortunato process for enzymatic hydrolysis of lactose to glucose and galactose, the lactase was directly added to the milk product being treated and the hydrolysis was arrested by treating the mixture of milk product and lactase preparation in a manner to inactivate and destroy the enzyme complex.

SUMMARY OF THE INVENTION

The present invention relates to a continuous flow process as opposed to the batch operations of Stimpson and Sfortunato and the process does not require the direct addition of an enzyme complex or any extraneous material to the process-fluid, that is, the milk products and the like being treated. In addition, the enzyme is not destroyed but is available for reuse as long as its active longevity permits. Also, the levels of glucose and galactose that accumulate in the process-fluid are constantly controlled and regulated to be maintained at desirable levels in the process-fluid without any alteration of the process-fluid in any way other than by the conversion of lactose in the original process-fluid to glucose and galactose.

In essential consequence, the process of the present invention is distinguished from the Sfortunato process in the constant flowing of the process-fluid and the enzyme complex with an active exchange therebetween but without direct addition of the enzyme or any foreign substance to the process-fluid and in the maintenance of concentrations of glucose and galactose at desirable levels in the process-fluid by regulation of the rate of fluid flow and continuous removal of quantities of such sustances from the process-fluid.

Generally stated, in accordance with the present invention, a fluid containing lactose, herein further identified as a "process-fluid," which term is intended in this specification and in the appended claims to refer to milk, any milk product or any lactose-containing product, is placed in flowing juxtaposition to a similar fluid containing lactase, herein further identified as an "enzyme-fluid." The process-fluid is flowingly housed in one chamber and the enzyme-fluid is flowingly housed in a second chamber in juxtaposition with the first chamber with the chambers being separated by a semi-permeable membrane that allows lactose and other substances to pass from one fluid chamber to the other but, at the same time, prevents lactase from passing therethrough.

The lactose contained in the two juxtaposed fluid chambers is converted to glucose and galactose at a rate dependent upon the temperature of the fluid and the concentration of the lactase enzyme which converts the lactose to glucose and galactose. The enzyme is not destroyed but is available for reuse as long as it remains active. It is never directly added to the process-fluid nor is any extraneous material ever added to the process-fluid.

The levels of glucose and galactose that accumulate in the process-fluid are controlled by the constant removal of these substances from a third chamber that is separated from the previous chambers by a semi-permeable membrane. A solution similar to the process-fluid is forced through the third chamber at a rapid rate relative to that in the process-fluid chamber. The formed glucose and galactose are maintained at a lower level in this chamber as compared with the other two chambers. The levels of glucose and galactose in the operation of the process are regulated by the rate of fluid flowing through the third chamber and are thereby brought to desired levels in the process-fluid.

The contents of the process-fluid is not altered in any way from the original fliud that constitutes such process-fluid, other than by the conversion of lactose to glucose and galactose, since all constituents of the process-fluid are present in the three chambers and at the same concentrations, being the very same fluid except for the addition of lactase to the second chamber.

Accordingly, an important object of the present invention is to provide a process and apparatus for the removal of lactose from fluids, such as milk and milk products, without the direct addition of any foreign substance or material to such fluids and, at the same time, while controlling the level of glucose and galactose.

A further important object of the present invention is to provide a process and apparatus for hydrolyzing lactose in milk or other lactose containing fluids by a fluid flowing operation wherein the rate of lactose hydrolysis can be governed by the rate of flow of the milk or other process-fluid.

A still further object of the present invention is to provide a simple, speedy and most efficient process for the enzymatic conversion of lactose to glucose and galactose in lactose containing fluids without the addition of an enzyme and, in consort therewith, to provide an apparatus for effecting such process, which apparatus has the operational and economic advantages of extreme simplicity and adaptability for efficient operation with a minimum of mechanical components.

DESCRIPTION OF THE PREFERRED EMBODIMENT

Figure 1:
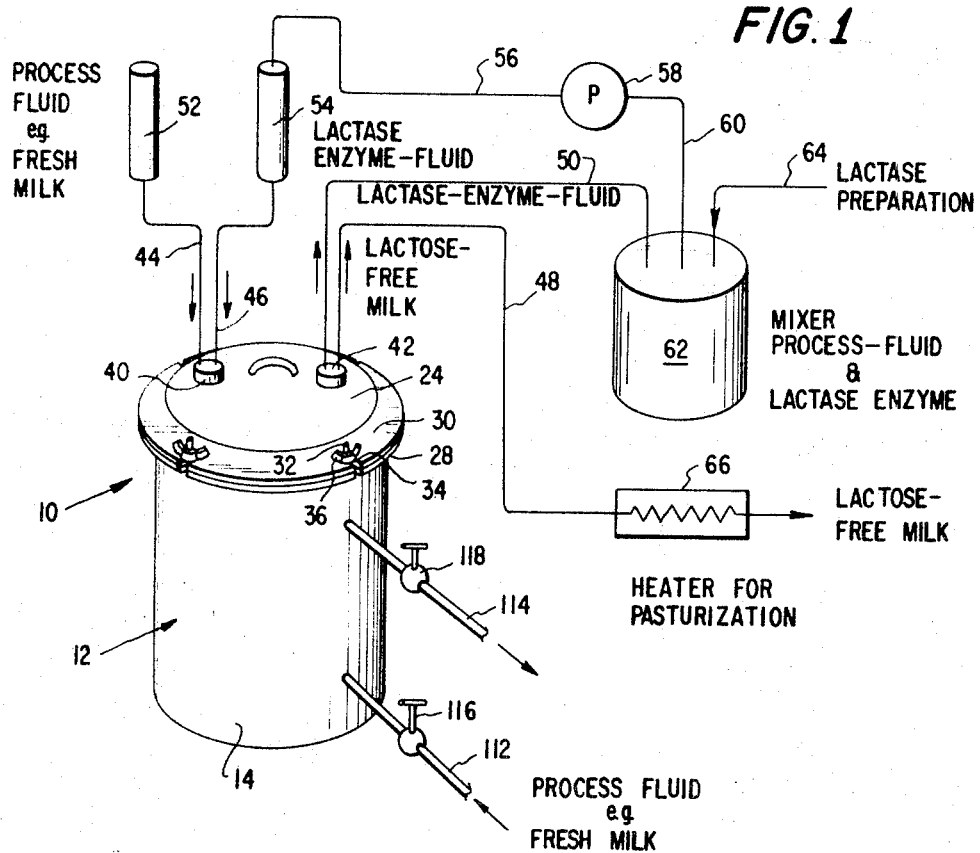
FIG. 1 is an overall illustration, partly in perspective and partly diagrammatic, of the preferred embodiment of the novel apparatus used for carrying out the process of this invention.

Referring now more particularly to the accompanying drawings and initially to FIG. 1, the numeral 10 generally designates a conversion unit used for carrying out the novel process of enzymatic conversion of lactose to glucose and galactose in lactose containing fluids. The unit includes a cylindrical vessel or tank 12 having a side wall 14. A tubular sleeve 16 is disposed an an inner core in the tank and is arranged concentrically with the side wall 14 to define a chamber 18 therewith.

The bottom of the chamber 18 is closed off by a bottom wall 20 that is arranged radially between the tank side wall 14 and the sleeve 16. The tank has an upper end 22 that is closed off by a cover 24 which sealingly closes off the upper end 26 of the chamber 18. Thus, when the cover is in closed position, the chamber 18 is closed off by the cover at its upper end and by the bottom wall 20.

The upper edge of the tank side wall 14 has a radially outstanding annular flange 28 that sealingly seats a mating annular peripheral flange 30 on the cover 24. Locking bolts 32 are hingedly carried by the tank flange 28 and are adapted to fit into radial seating slots 34 formed in the edge of the cover flange 30. The threaded shanks of the bolts carry wing nuts 36 that clamp the flanges tightly together when the bolt shanks are fitted in the slots 34.

The cover 24 has a centrally positioned handle 38 and on each side of the handle it is provided with fittings 40 and 42 that extend vertically through the cover from the outside of the tank to the inside thereof when the cover is closed. The fittings are disposed so as to communicate with the chamber 18 at radially opposite points. The fitting 40 supports a pair of tubes 44 and 46 while the fitting 32 supports a similar pair of tubes 48 and 50.

As shown in FIG. 1, the tube 44 communicatingly extends from a reservoir 52 that contains the process-fluid, which may be milk, flowable milk products or any flowable lactose containing substance. The tube 46 communicatingly extends from a reservoir 54 that contains the enzyme-fluid which is a fluid similar to the process-fluid to which lactase has been added. In this regard, the reservoir 54 is connected by a conveyance pipe 56 with a pump 58 that is in fluid communication through a pipe 60 with a mixer tank 62 containing a stirrer mechanism, such as a magnetic stirrer. A lactase preparation is placed in the mixer tank 62 through a conduit means 64 and is mixed therein with the same fluid as the process-fluid by the stirrer mechanism and the resultant enzyme-fluid is pumped through the pump 58 to the reservoir 54 and then into the tube 46.

The tube 50 defines a return line from the tank 12 for the enzyme-fluid and returns the enzyme-fluid to the mixer tank 62 for continuous recycling through the tube 46 with lactase being added to the mixer tank as it is neexed. The tube 48 constitutes an outlet line for the lactose-free or low-lactose process-fluid, such as milk, which is passed through a heater 66 maintained at a temperature sufficient for pasteurization of the milk.

Figure 2:
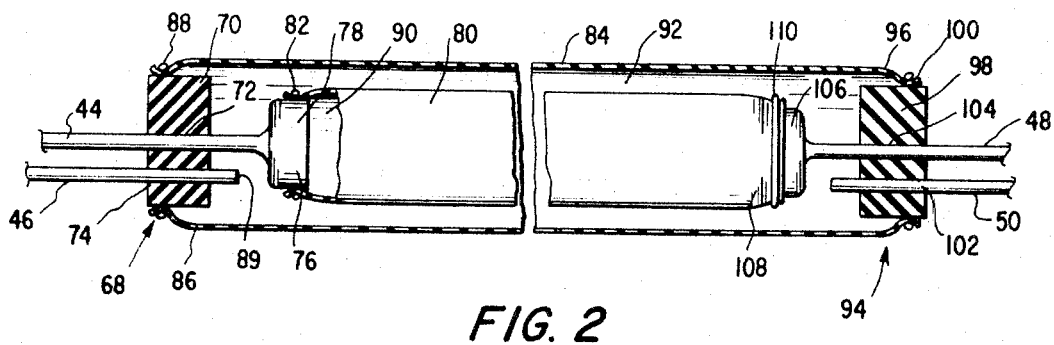
FIG. 2 is a detailed elevational view, partly in section, of the dialysis tubing that defines the first and second chambers of the invention with process-fluid flowing through one tube and the enzyme-fluid flowing through the other tube of the tubing that is a semi-permeable membrane.
Figure 3:
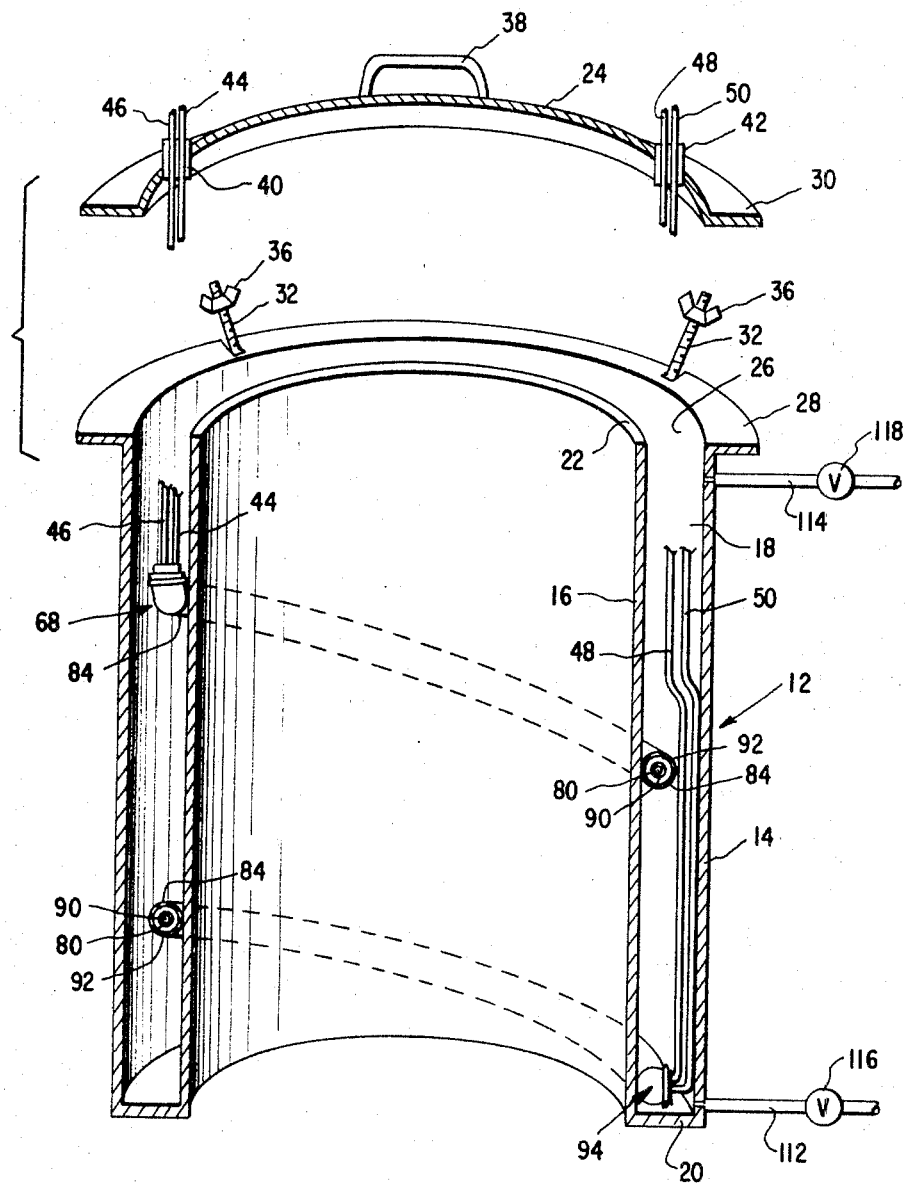
FIG. 3 is a detailed vertical sectional view of the tank containing the third chamber and in which the tubing that defines the first and second chambers is positioned.

After the tubes 44 and 46 pass through the fitting 40, they are attached to a dialysis tubing manifold 68, as shown in FIGS. 2 and 3. The manifold 68 includes a resilient block 70 having bores 72 and 74 formed therethrough. The process-fluid tube 44 extends through the bore 72 and terminates in an enlargement 76 around which one end portion 78 of a dialysis tubing 80 formed from a semi-permeable membrane is fixedly circumposed by an encircling flexible tie member 82. The tubing 30, which defines a first chamber, is concentrically encompassed in a radially spaced manner by a dialysis tubing 84 which defines a second chamber. The end portion 86 of the dialysis tubing 84, which is formed from a similar semi-permeable membrane, is fitted over the block 70 and tightly secured thereon by a flexible tie element 88.

The terminal open end 89 of the enzyme-fluid tube 46 extends through the bore 74 in the block 70 and is in open and free fluid communication with the second chamber 92 that is defined by the space between the tubings 80 and 84 while the terminal open inner end of the process-fluid tube 44 is in open and free fluid communication with the first chamber 90 that is defined by the space inside the tubing 80.

The inner ends of the return tubes 48 and 50, after passing through the fitting 42, are attached to the tubings 80 and 84 in free fluid communication with their respecitve chambers by a manifold arrangement 94 which is identical to the manifold arrangement 68. Thus, the opposite end portion 96 of the tubing 84 is secured around a bored resilient block 98 by a flexible tie element 100 while the tube 50 passes through a bore 102 in the block 98 so as to be in free communication with the chamber 90. The tube 48 passes through a bore 104 in such block and terminates in an enlargement 106 around which the opposite end portion 108 of the tubing 80 is secured by a flexible tie element 110.

The concentrically arranged dialysis tubings 80 and 84, which define the first and second chambers 90 and 92, respectively, for the process-fluid and the enzyme-fluid, are coiled around the inner core or sleeve 16 and supported thereby within the space 18 that constitutes a third chamber for the rapid flow of process-fluid, e.g., milk. An inlet conduit 112 for admitting the process-fluid into the chamber 18 is attached to the tank side wall 14 adjacent the bottom thereof while an outlet conduit 114 for the withdrawal of the process-fluid from the chamber 18 is attached to the tank side wall 14 adjacent the top thereof. The inlet conduit 112 has a hand valve 116 and the outlet conduit 114 is supplied with a similar valve 118.

The process-fluid admitted into the chamber 18 through the inlet conduit 112 is maintained at a constant temperature, generally the optimum temperature for the lactase utilized, and the temperature in the tank 12 is thermostatically regulated to maintain the same constant temperature within the chamber 18. The inlet manifold 68 for the connection of the inlet tubes 44 and 46 to the dialysis tubings is disposed in the chamber 18 adjacent the upper end of the tank while the outlet manifold 94 for the outlet tubes 48 and 50 is disposed in the chamber 18 adjacent the bottom wall and the flow in the first and second chambers 90 and 92 is in the same direction, that is, downward, while the flow in the third chamber 18 is in the opposite or upward direction.

In operation of the unit 10 and in performance of the method of this invention, process-fluid, e.g., milk, is placed in the reservoir 52 and is allowed to flow through the tube 44 into the dialysis tubing 80 and to fill the first chamber 90. The reservoir 52 provides a hydrostatic pressure in the dialysis tubing 80 equal to that in the dialysis tubing 84. In this regard, a lactase preparation is placed in the mixer tank 62 where it is admixed with the same fluid as the process-fluid. The resultant enzyme-fluid mixture is pumped into the reservoir 54 and flows through the tube 46 to fill the tubing 84 and the chamber 92. The reservoir 54 provides a fixed hydrostatic pressure in the tubing 84.

Fresh fluid, which is the same as the process-fluid, is admitted into the third chamber 18 and fills the chamber until it flows out the outlet 114 with the fluid in the chamber 18 being maintained at constant temperature.

As process-fluid flows through the dialysis tubing 80 and within the first chamber 90 it is bathed by the lactase mixture or enzyme-fluid in the dialysis tubing 84 and within the second chamber 92. The lactase does not permeate the membrane of the tubings due to its larger molecular weight. However, lactose is free to pass through the tubings and from the first chamber to and from the second chamber. Thus, the lactose is acted on by the lactase enzyme in the chamber 92 and glucose and galactose are produced. The glucose and galactose are free to pass from the tubing 84 into the tubing 80 and vice versa or from one chamber into and from another chamber.

The tubing 84 defining the second chamber is bathed with the fluid in the third chamber 18, such fluid being the same as the process-fluid. This fluid flows in and out of the chamber 18 in the tank 12 at a greater rate of flow than the fluids in the dialysis tubings 80 and 84. Lactose, glucose and galactose in the chamber 18 can pass into the dialysis tubing 84 and vice versa. The lactast cannot pass into the chamber 18 of the tank since it is confined to the tubing 84 and chamber 92 by the dialysis membrane structure of the tubing 84.

The transit time of the fluid in the chamber 18 is short so that the amount of glucose and galactose that accumulate is less than in the other two fluid chambers 90 and 92. The movement of glucose and galactose into the chamber 18 from the other two chambers 90 and 92 is favored. This provides a means of regulating the levels of glucose and galactose in the system. The resultant effect is a decrease of lactose in the process-fluid as it passes through the apparatus without the levels of glucose and galactose exceeding desirable concentrations. The enzyme-fluid mixture is maintained at an optimum activity level by renewal of the enzyme by addition through pipe 64 at the mixer tank 62.

Practical tests have shown that the method removes lactose from milk at the rate of 44 grams per meter of membrane surface area per hour at 42°C., the optimum temperature for the particular lactase utilized. This is approximately 90 percent removal of lactose per liter of milk per hour for each square meter of membrane surface area; a slower process-fluid flow-rate would result in even greater lactose removal. The concentration of lactase in the enzyme-fluid mixture was 5 percent and the enzyme-containing mixture is dialyzed against process-fluid (which is then discarded) to assure complete removal of any dialyzable contaminate prior to use in production of low-lactose or lactose-free milk.

It can thus be appreciated that the apparatus and method of this invention ensure the removal of lactose from fluids, such as milk, through the action of lactase without the addition of any foreign material to the milk or other process-fluid while, at the same time, controlling the levels of glucose and galactose. The method and apparatus are particularly applicable to processing milk to obtain lactose-free or low-lactose milk which has many valuable uses, as is well known in the art.

While the best known form of the apparatus and best manner of practicing the method of this invention have been illustrated and described herein, such is merely exemplary in nature and should not be considered limitative. Thus, the abstract, specification and drawings should not be restrictively considered and the method and apparatus invention is only to be limited in conformance with the spirit and scope of the appended claims.

We claim:

1. A method of converting lactose in lactose containing process-fluids, such as milk, to glucose and galactose with a lactase enzyme comprising the steps of:
   a. passing a process-fluid containing lactose through a first chamber;
   b. simultaneously passing a lactase enzyme-fluid through a juxtaposed second chamber separated from the first chamber by a semi-permeable membrane so that the lactase enzyme-fluid bathes the process-fluid containing first chamber; and,
   c. permitting the lactose to pass through the membrane barrier while preventing the lactase from penetrating the membrane barrier due to its large molecular weight.

2. The invention of claim 1 wherein glucose and galactose produced in the second chamber are permitted to return through the membrane into the first chamber.

3. The invention of claim 1 including the recycling of the enzyme-fluid with the step of adding lactase enzyme to the enzyme-fluid as needed.

4. The invention of claim 1 including the passage of the process-fluid through a heater after removal of the lactose by the enzyme-fluid.

5. The invention of claim 1 wherein said chambers are concentrically arranged dialysis tubing whereby the lactose in the process-fluid in the first chamber is acted upon the lactase enzyme in the enzyme-fluid in the second chamber to produce glucose and galactose.

6. The invention of claim 5 including the step of controlling the level of the glucose and galactose in the process-fluid.

7. The invention of claim 5 including simultaneously passing a fluid similar to the process-fluid through a third chamber surrounding the second chamber and separated therefrom by semi-permeable membrane at a greater rate than the flow of process-fluid and enzyme-fluid in the dialysis tubing to constantly remove glucose and galactose from the process-fluid and thereby control the levels of such substances in the process-fluid.

8. The invention of claim 7 wherein the fluid in the third chamber is maintained at a constant temperature of approximately 42°C.

9. A method of converting lactose in milk to glucose and galactose with a lactase enzyme not directly added to the milk comprising the steps of:

a. passing the milk containing lactose through a first chamber;
b. simultaneously passing a lactase enzyme-fluid through a juxtaposed second chamber separated from the first chamber by a semi-permeable membrane so that the lactase enzyme-fluid bathes the milk containing first chamber; and,
c. permitting the lactose to pass through the membrane barrier while preventing the lactase from penetrating the membrane barrier due to its large molecular weight.

* * * * *